(12) United States Patent
Watanabe et al.

(10) Patent No.: US 7,156,564 B2
(45) Date of Patent: *Jan. 2, 2007

(54) BLADE DRIVING DEVICE FOR USE IN CAMERAS

(75) Inventors: Nobuaki Watanabe, Tokyo (JP); Shigeru Yamagishi, Tokyo (JP); Tohru Eguro, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 183 days.

This patent is subject to a terminal disclaimer.

(21) Appl. No.: 10/940,959

(22) Filed: Sep. 15, 2004

(65) Prior Publication Data

US 2005/0058444 A1 Mar. 17, 2005

(30) Foreign Application Priority Data

Sep. 17, 2003 (JP) ............................. 2003-323996

(51) Int. Cl.
*G03B 9/08* (2006.01)

(52) U.S. Cl. ...................................... 396/463; 396/508
(58) Field of Classification Search ................ 396/463, 396/469, 508
See application file for complete search history.

(56) References Cited

U.S. PATENT DOCUMENTS

| | | | | |
|---|---|---|---|---|
| 4,119,986 A | * | 10/1978 | Koyama et al. | ............ 396/463 |
| 5,173,728 A | * | 12/1992 | Sangregory et al. | ........ 396/454 |
| 6,443,635 B1 | * | 9/2002 | Matsumoto et al. | ........ 396/463 |
| 6,726,380 B1 | | 4/2004 | Watanabe et al. | ........... 396/463 |

FOREIGN PATENT DOCUMENTS

| | | |
|---|---|---|
| JP | 07-234434 | 9/1995 |
| JP | 2002-055376 | 2/2002 |

* cited by examiner

*Primary Examiner*—W. B. Perkey
(74) *Attorney, Agent, or Firm*—Wenderoth, Lind & Ponack, L.L.P.

(57) ABSTRACT

A blade driving device for use in cameras of the present invention includes a base plate having an exposure aperture, an ND filter blade that is supported rotatably around a supporting shaft on the base plate and is moved to a position withdrawn from the exposure aperture and a position facing the exposure aperture, and an electromagnetic actuator that drives the ND filter blade. This electromagnetic actuator includes a frame member joined to the base plate, a rotor which has a drive pin for exerting a driving force and rotates within a predetermined angle range with one end of which being supported to the frame member and the other end of which being supported to the base plate, and an exciting coil wound around the frame member and the base plate. Therefore, the structure of the electromagnetic actuator for driving a shutter blade, a diaphragm blade, an ND filter blade or the like can be simplified and reduced in cost, and this makes it possible to reduce the size and thickness of the device.

10 Claims, 17 Drawing Sheets

Fig.1
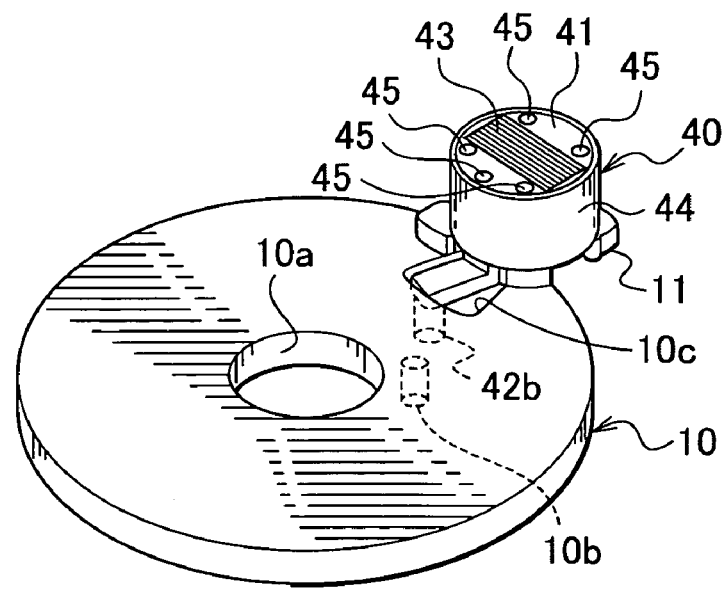
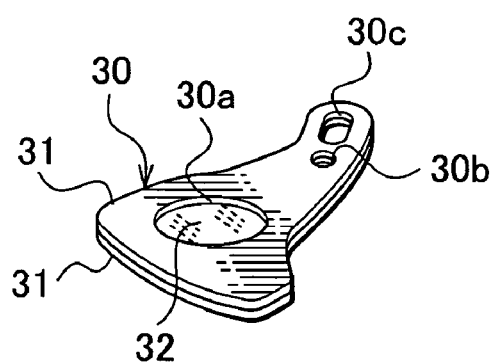
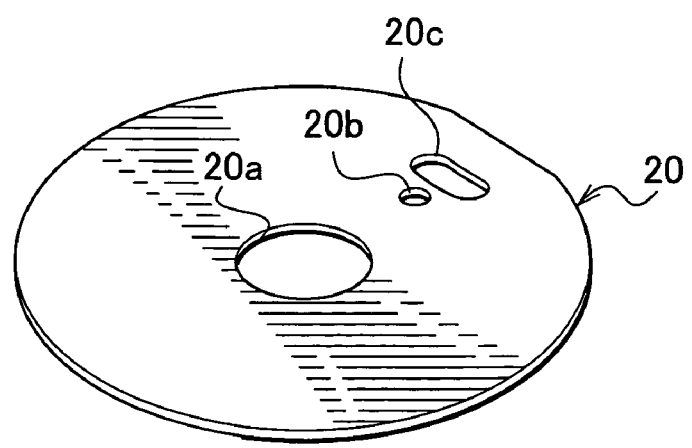

Fig.7
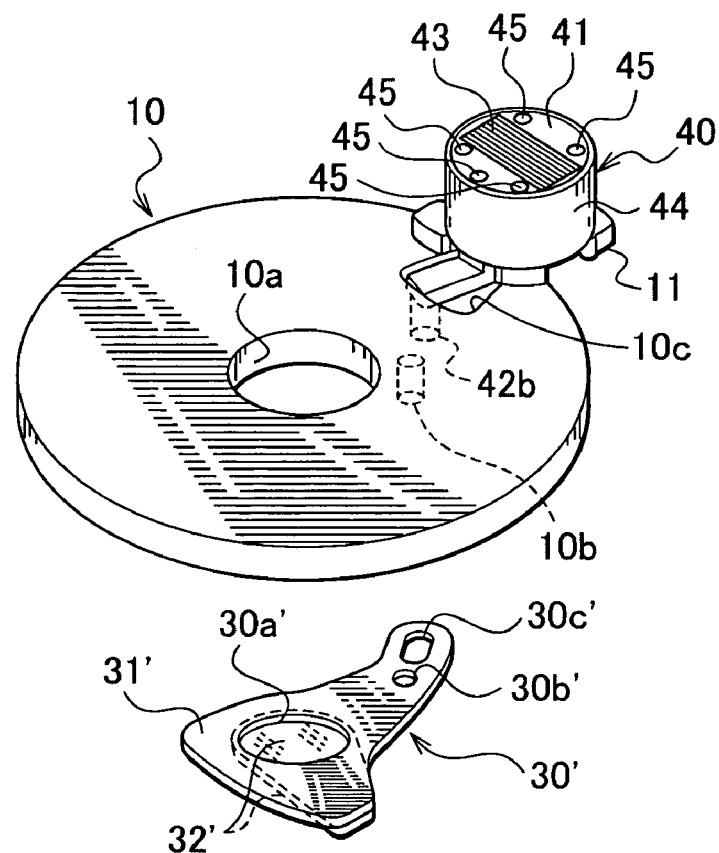
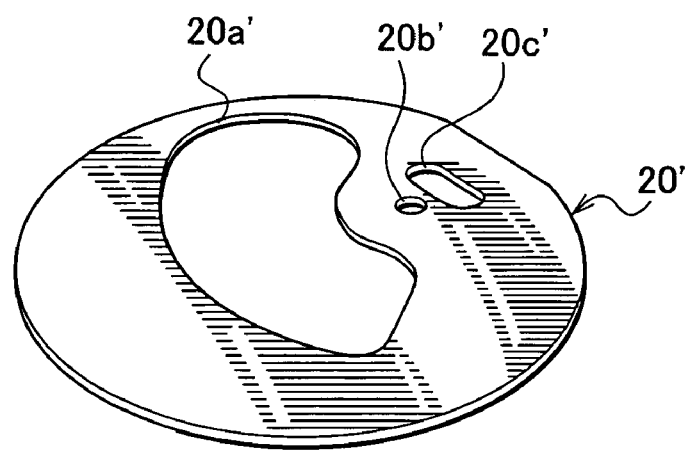

Fig.9
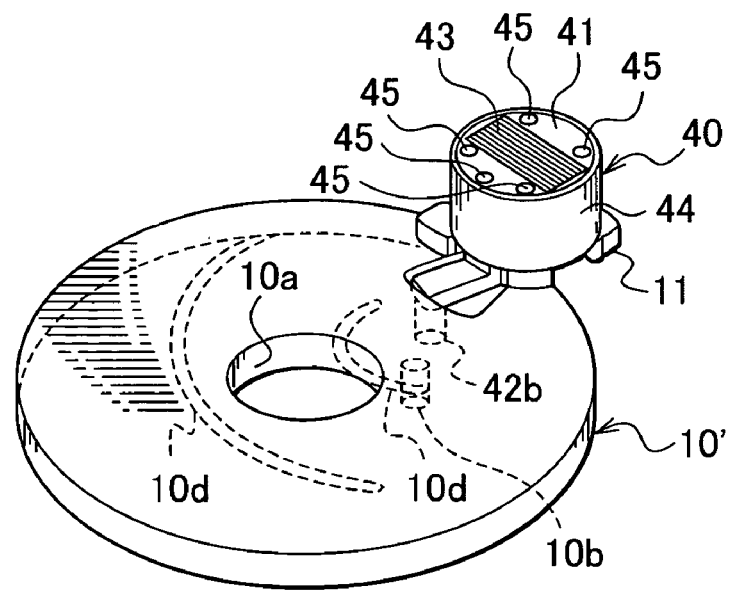
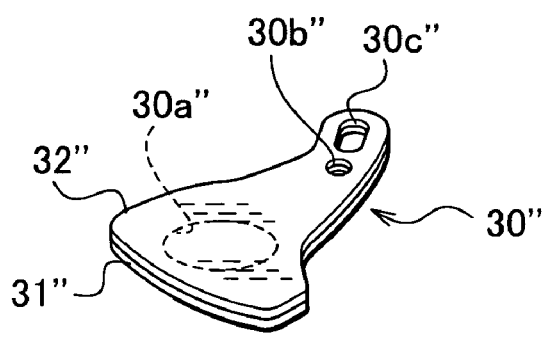
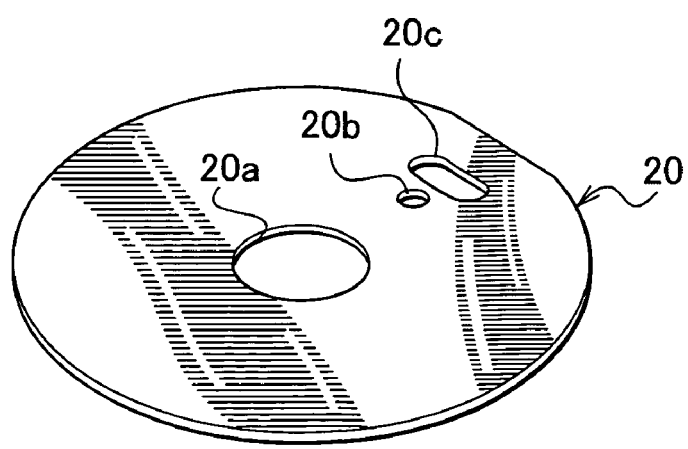

Fig.11
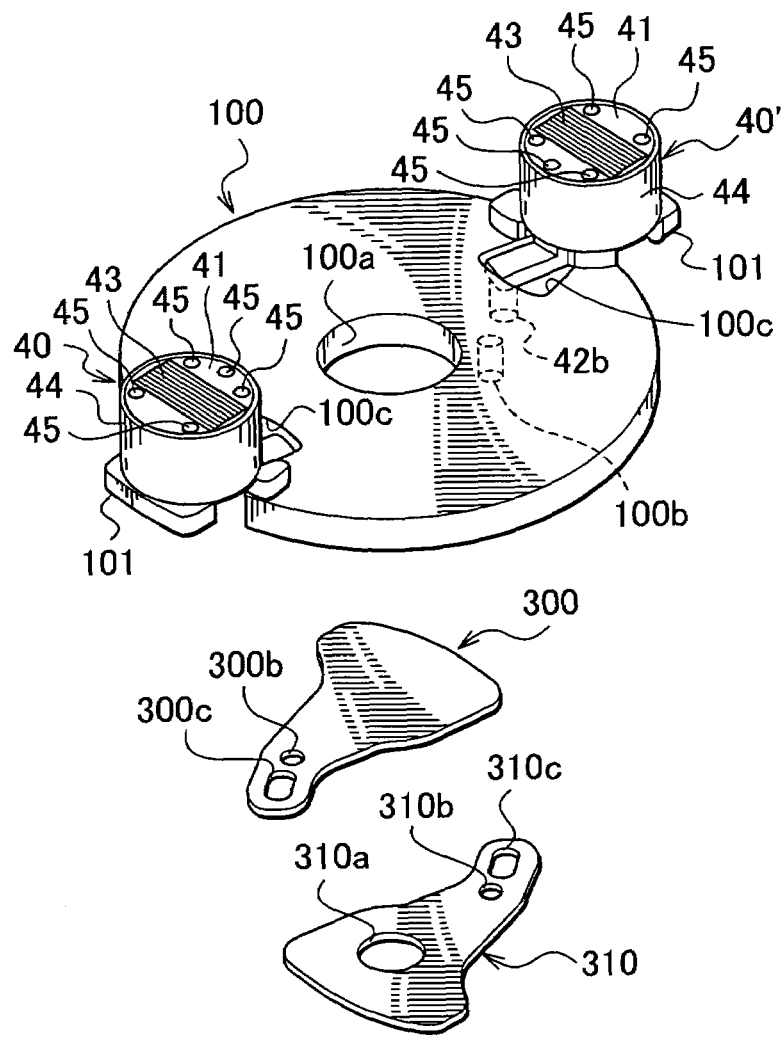
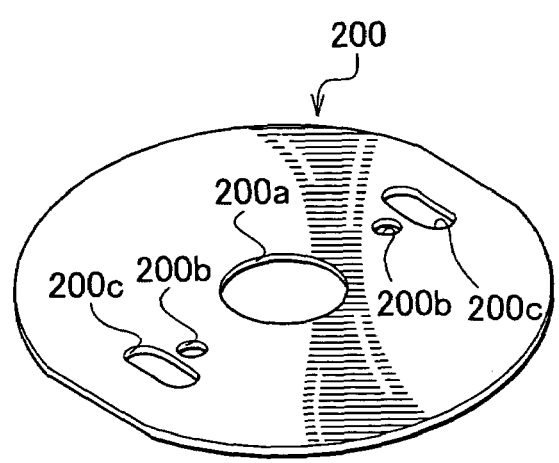

Fig.16
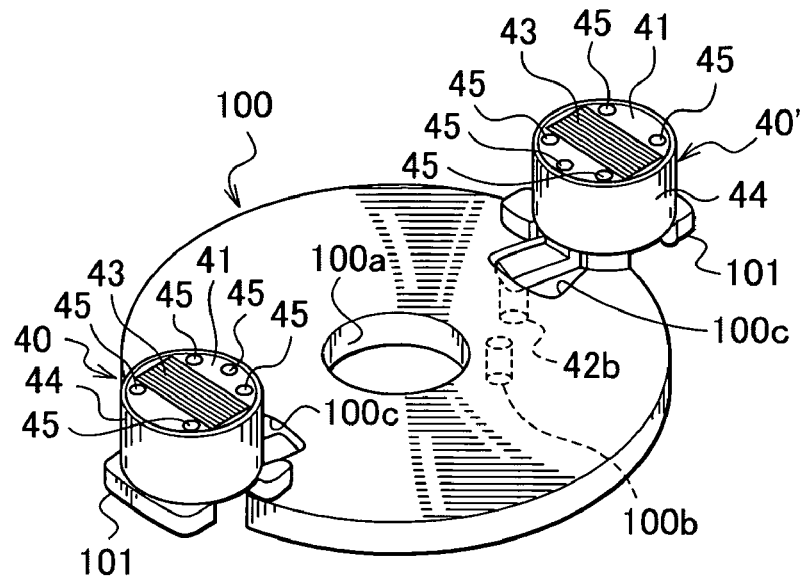
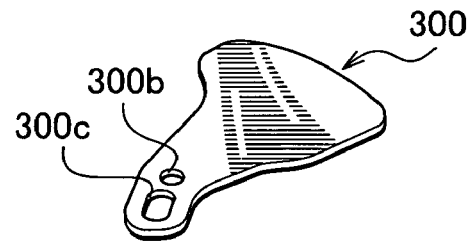
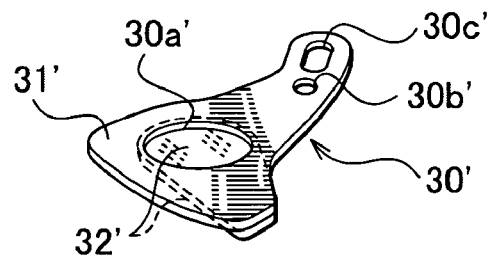
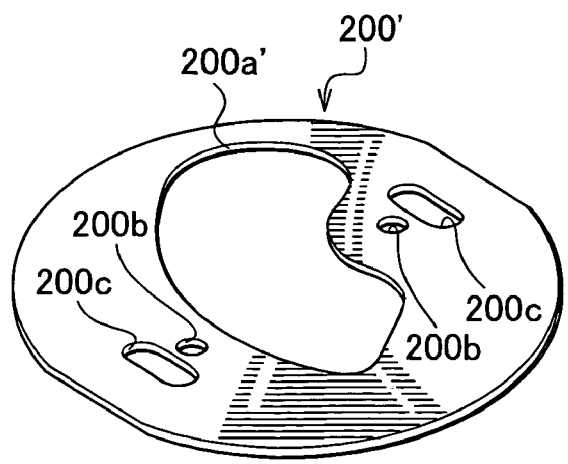

BLADE DRIVING DEVICE FOR USE IN CAMERAS

BACKGROUND OF THE INVENTION

1. Field of the Invention

The present invention relates to a blade driving device for use in cameras which is installed in a camera, etc., and drives a blade that opens and closes an exposure aperture or a blade that reduces the amount of light to pass through the exposure aperture, and more particularly, a blade driving device for use in cameras which comprises an electromagnetic actuator including a rotor for driving the blade.

2. Description of the Related Art

As a conventional blade driving device for use in cameras, for example, there is known a blade driving device for use in cameras which drives a shutter blade or a diaphragm blade by joining an electromagnetic actuator, formed of an upper frame member and a lower frame member that are joined to each other and rotatably support a rotor, an exciting coil wound around the upper frame member and the lower frame member, and a cylindrical yoke or the like attached to the upper frame member, to a base plate having an exposure aperture by screws, etc. (For example, refer to Japanese Published Unexamined Patent Application No. 2002-55376, and Japanese Published Unexamined Patent Application No. H07-234434).

The conventional device is structured so that the electronic actuator is formed as a unit in advance and joined by means of screws, etc., to a substrate prepared separately. Therefore, in manufacturing, a step of assembling only the electromagnetic actuator in advance and a step of attaching the electromagnetic actuator that has been completely assembled to the substrate are necessary, and this makes the manufacturing process complicated and increases the number of components due to the formation of the electromagnetic actuator as a unit, resulting in high costs, a complicated structure, and an increase in size.

SUMMARY OF THE INVENTION

The present invention has been made in consideration of the abovementioned problems in the conventional art, and an object thereof is to provide a blade driving device for use in cameras which employs an electromagnetic actuator which is capable of simplifying the manufacturing process and the structure by reducing the number of components to as small as possible, and drives a shutter blade, a diaphragm blade, or an ND filter blade, etc., by the electromagnetic actuator in, in particular, small-sized digital cameras.

The blade driving device for use in cameras of the present invention achieving the abovementioned object includes a base plate having an exposure aperture, a blade member which is rotatably supported by a supporting shaft on the base plate and is movable to a position withdrawn from the exposure aperture and a position facing the exposure aperture, and an electromagnetic actuator that drives the blade member. The electromagnetic actuator includes a frame member to be joined to the base plate, a rotor which has a drive pin that exerts a driving force to the blade member and rotates within a predetermined angle range with one end of the rotor being supported by the frame member and the other end of the rotor being supported by the base plate, and an exciting coil wound around the frame member and the base plate. The blade member is a shutter blade that opens and closes the exposure aperture, a diaphragm blade that stops down the exposure aperture to a predetermined diameter, or an ND filter blade that reduces the amount of light by covering the exposure aperture.

According to this structure, the rotor is supported in a rotatable manner by the frame member and the base plate and the coil is wound around the frame member and the base plate, so that the electromagnetic actuator can be assembled simultaneously with the step of attaching various parts to the substrate. Namely, in comparison with the conventional art, only one frame member is used, and the coil is wound around the frame member and the base plate while sandwiching and holding the rotor in a rotatable manner, so that fastening parts such as screws become unnecessary. Therefore, the number of parts can be reduced and a simplified structure and low cost are realized, and in addition, the structure of the electromagnetic actuator is simplified and reduced in height, whereby the device can be reduced in size and thickness.

Furthermore, by this electromagnetic actuator, the shutter blade, the diaphragm blade, or the ND filter blade is driven to open and close the exposure aperture or adjust the amount of light to pass through the exposure aperture, and the like.

In the aforementioned structure, it is possible that the electromagnetic actuator is structured so as to include a yoke provided outside the coil roughly coaxially with the rotor.

According to this structure, the lines of magnetic force formed around the coil are guided by the yoke, whereby a greater electromagnetic force is obtained.

In the aforementioned structure, it is possible that two electromagnetic actuators, a shutter blade, and a diaphragm blade are provided on the base plate, and one of the two electromagnetic actuators is formed so as to drive the shutter blade, and the other one of the two electromagnetic actuators is formed so as to drive the diaphragm blade.

According to this structure, a shutter device for use in cameras for opening and closing the exposure aperture and a diaphragm device for use in cameras for stopping down the exposure aperture to a predetermined diameter are compatible in one device. Therefore, the camera or the like in which this device is installed can be downsized.

In the aforementioned structure, it is also possible that two electromagnetic actuators, a shutter blade, and an ND filter blade are provided on the base plate, and one of the two electromagnetic actuators is formed so as to drive the shutter blade, and the other one of the two electromagnetic actuators is formed so as to drive the ND filter blade.

According to this structure, a shutter device for use in cameras for opening and closing the exposure aperture and a light amount adjusting device for use in cameras for reducing the amount of light to pass through the exposure aperture are compatible in one device. Therefore, a camera or the like in which this device is installed can be downsized.

In the aforementioned structure, it is also possible that two electromagnetic actuators and two diaphragm blades with diameters different from each other are provided on the base plate, and one of the two electromagnetic actuators is formed so as to drive one of the two diaphragm blades and the other one of the two electromagnetic actuators is formed so as to drive the other one of the two diaphragm blades.

According to this structure, a diaphragm device for use in cameras, which realizes two-step stopping down of the exposure aperture to two diameters can be formed.

In the aforementioned structure, it is possible that two electromagnetic actuators and two ND filter blades that provide densities different from each other are provided on the base plate, and one of the two electromagnetic actuators is formed so as to drive one of the two ND filter blades, and the other one of the two electromagnetic actuators is formed so as to drive the other one of the two ND filter blades.

According to this structure, a light amount adjusting device for use in cameras, which can reduce the amount of light to pass through the exposure aperture in two steps can be formed in one device.

In the aforementioned structure, it is possible that two electromagnetic actuators, a diaphragm blade, and an ND filter blade are provided on the base plate, and one of the two electromagnetic actuators is formed so as to drive the diaphragm blade and the other one of the two electromagnetic actuators is formed so as to drive the ND filter blade.

According to this structure, a diaphragm device for use in cameras which stops down the exposure aperture to a predetermined diameter and a light amount adjusting device for use in cameras which reduces the amount of light to pass through the exposure aperture are compatible in one device. Therefore, a camera, etc., in which this device is installed can be downsized.

In the aforementioned structure, it is possible that an ND filter blade includes a pair of blades that define the exposure aperture with a predetermined diameter, an ND filter sandwiched between and joined to the pair of blades.

According to this structure, since the ND filter forms a laminated structure by being sandwiched by the pair of blades, the mechanical strength is increased and the ND filter is prevented from being flawed, and furthermore, a blanking die can be used commonly, resulting in reduction in manufacturing costs, etc.

In the aforementioned structure, it is possible that the ND filter blade includes a blade that defines the exposure aperture with a predetermined diameter and an ND filter joined to one side surface of the blade.

According to this structure, the ND filter blade can be made thinner and lighter in weight than the ND filter blade with a laminated structure, and furthermore, the device can be made thinner.

In the abovementioned structure, it is possible that the ND filter blade is formed so that an opposite side surface of the ND filter joined to the blade is supported by a guide rail provided on the base plate.

According to this structure, the ND filter blade can smoothly move to a position facing the exposure aperture and a position withdrawn from the exposure aperture by being guided by the guide rail.

BRIEF DESCRIPTION OF THE DRAWINGS

FIG. 1 is an exploded perspective view showing an embodiment of a blade driving device for use in cameras relating to the present invention.

FIG. 7 is an exploded perspective view showing another embodiment of the blade driving device for use in cameras relating to the present invention.

FIG. 9 is an exploded perspective view showing still another embodiment of the blade driving device for use in cameras relating to the present invention.

FIG. 11 is an exploded perspective view showing still another embodiment of the blade driving device for use in cameras relating to the present invention.

FIG. 16 is an exploded perspective view showing still another embodiment of the blade driving device for use in cameras relating to the present invention.

DESCRIPTION OF THE PREFERRED EMBODIMENTS

Hereinafter, preferred embodiments of the present invention are described with reference to the accompanying drawings.

Figure 2:
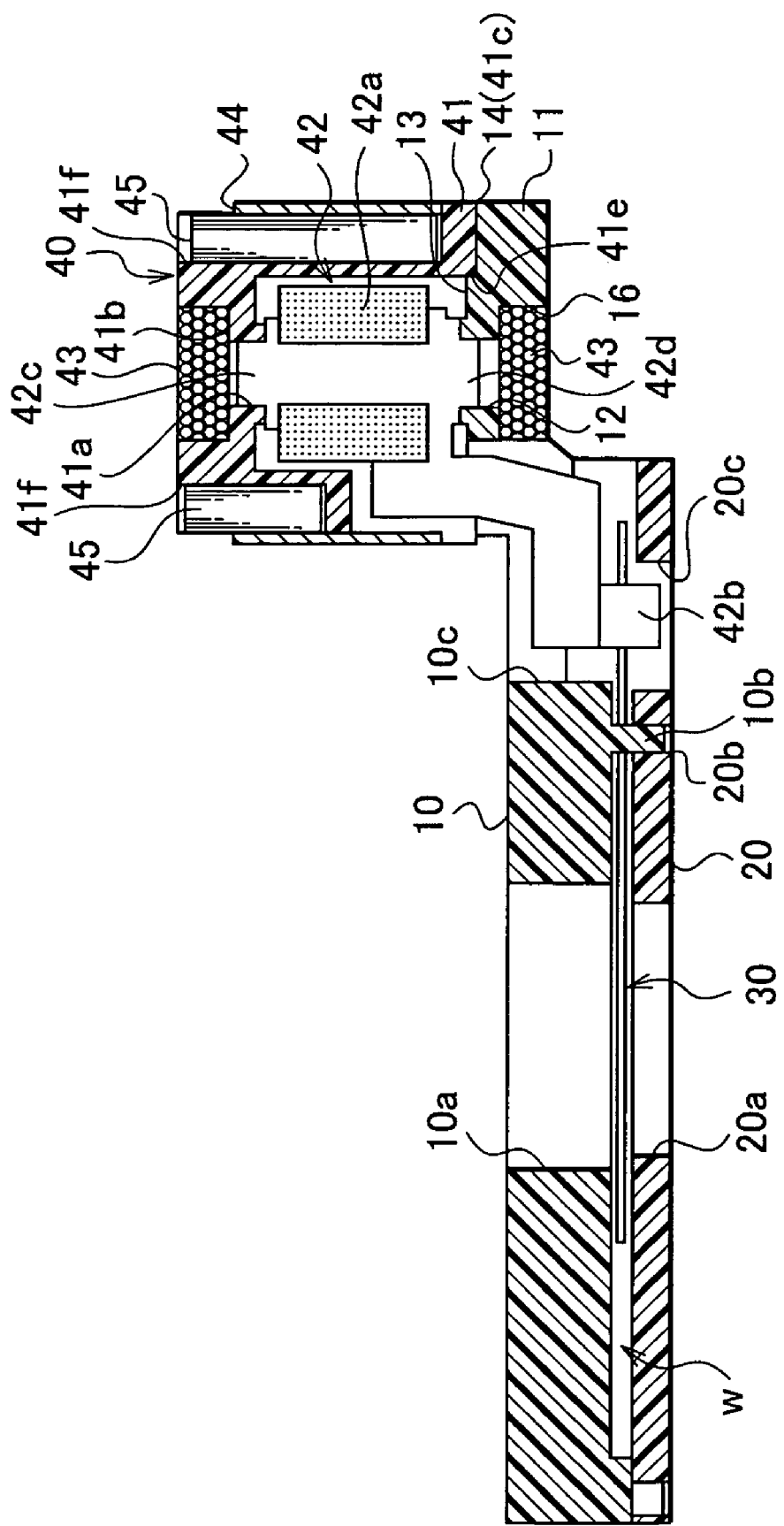
FIG. 2 is a sectional view of the device shown in FIG. 1.

A light amount adjusting device as an embodiment of a blade driving device for use in cameras of the present invention includes, as shown in FIG. 1 and FIG. 2, a main plate 10 and a back plate 20 as a base plate that have exposure apertures 10a and 20a, an ND filter blade 30 as a blade member that is supported to be rotatable around a supporting shaft 10b on the main plate 10 and moves to a position facing the exposure apertures 10a and 20a and a position withdrawn from the exposure apertures 10a and 20a, and an electromagnetic actuator 40 that drives the ND filter blade 30, and so on.

Figure 4:
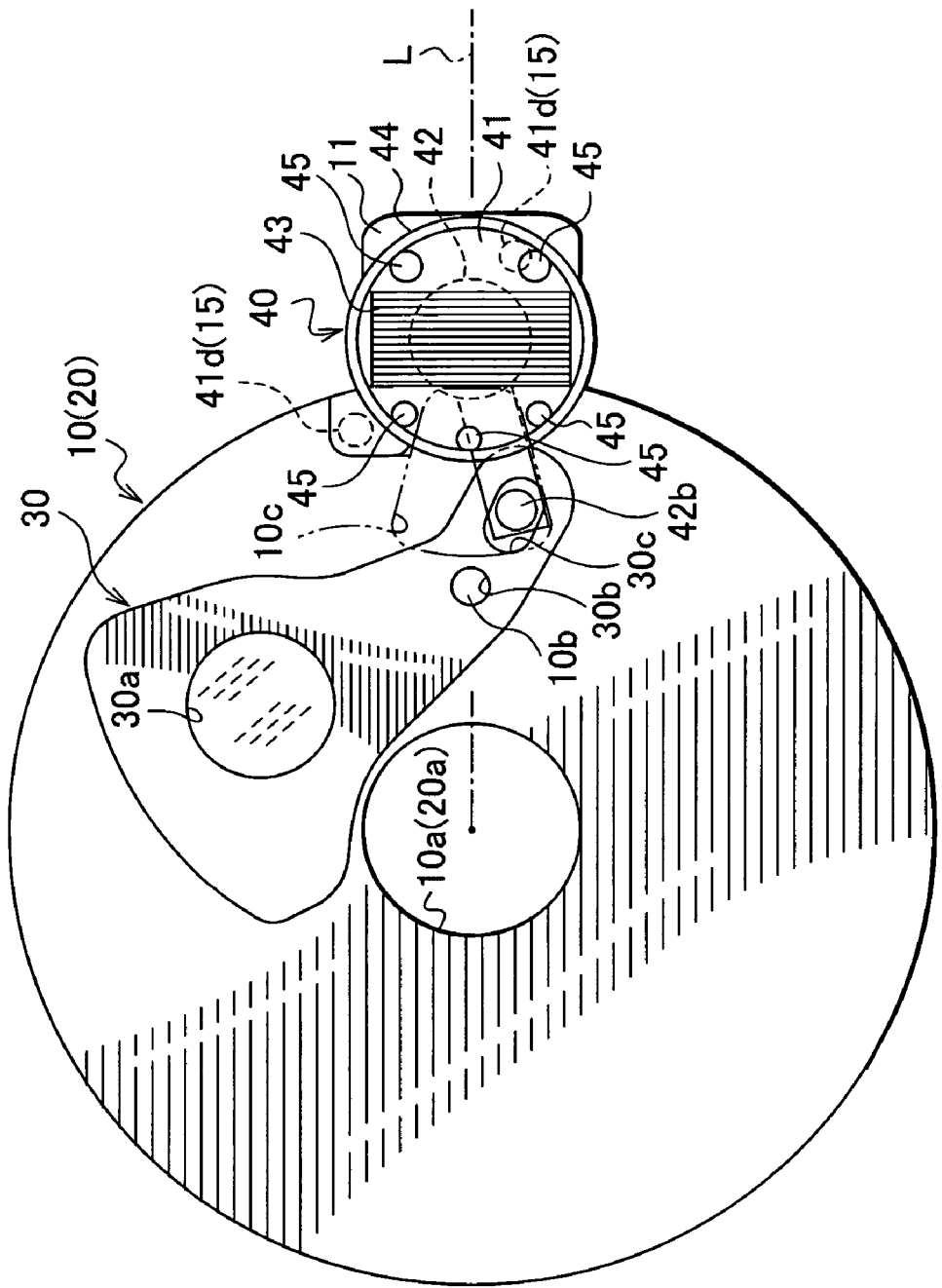
FIG. 4 is a plan view showing a condition where the ND filter blade is at a position withdrawn from an exposure aperture in the device shown in FIG. 1.
Figure 5:
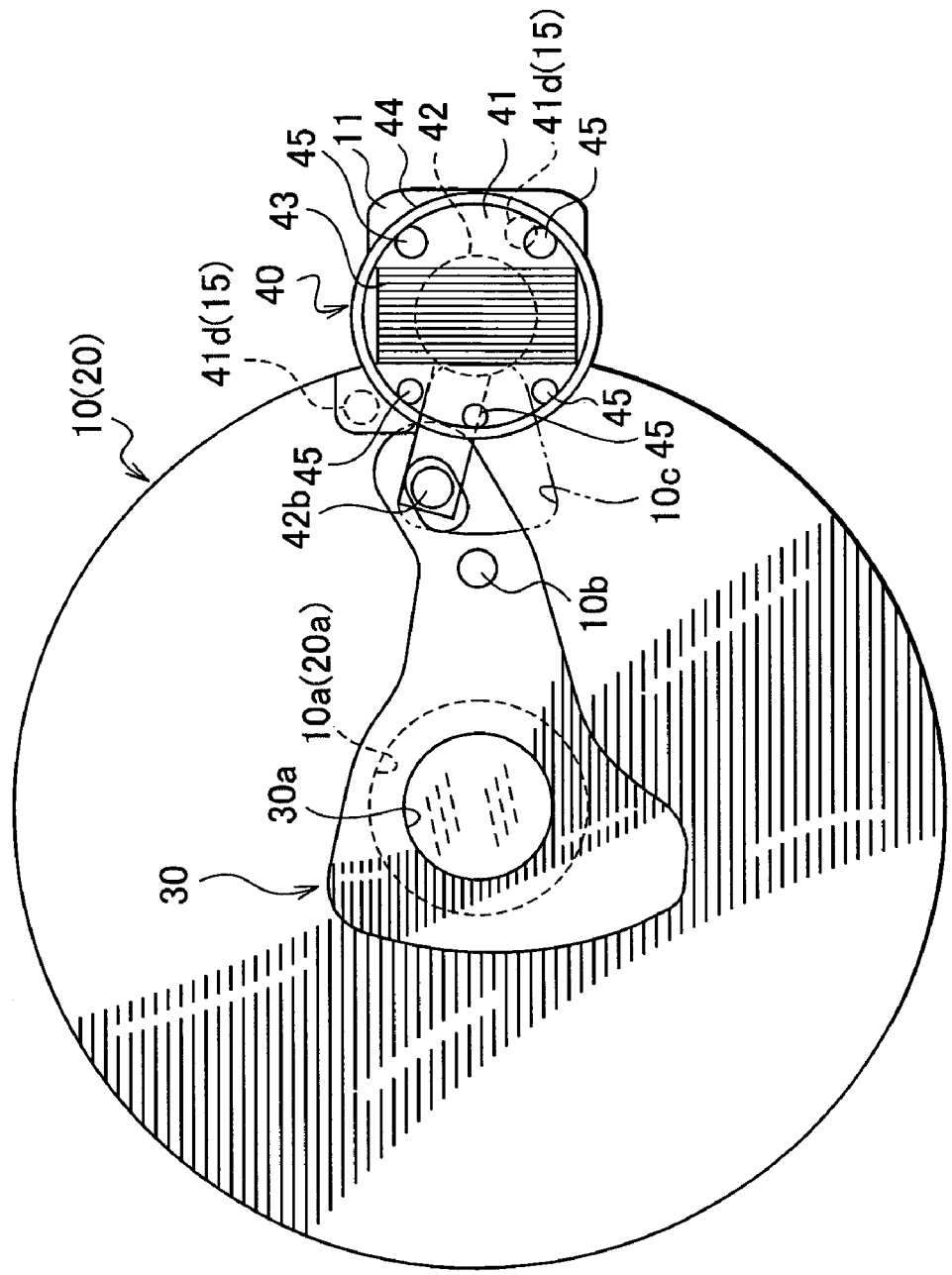
FIG. 5 is a plan view showing a condition where the ND filter blade is at a position facing the exposure aperture in the device shown in FIG. 1.

As shown in FIG. 1, FIG. 2, FIG. 4, and FIG. 5, the main plate 10 is roughly formed into a disk shape, and on a part of its outline form, a plate-shaped projection 11 that projects outward in the diameter direction with respect to the exposure aperture 10a is integrally formed, and in an inside region of the projection 11, a roughly fan-shaped through hole 10c is formed. At the projection 11 and the vicinity thereof, as shown in FIG. 2, FIG. 4, and FIG. 5, a bearing hole 12 for supporting an end 42d of a rotor 42 to be described later, an annular convex portion 13 around the bearing hole, a flat joint surface 14 around the annular convex portion 13, two fitting holes 15 opened through the joint surface 14, and a winding groove 16 for winding a coil 43 (described later) are formed.

The back plate 20 has, as shown in FIG. 1 and FIG. 2, the exposure aperture 20a, a circular hole 20b for inserting the supporting shaft 10b, and a long hole 20c for inserting a drive pin 42b (described later), and so on, and defines a blade chamber W for housing the ND filter blade 30 by being joined to the main plate 10 while leaving a predetermined space.

Figure 3:
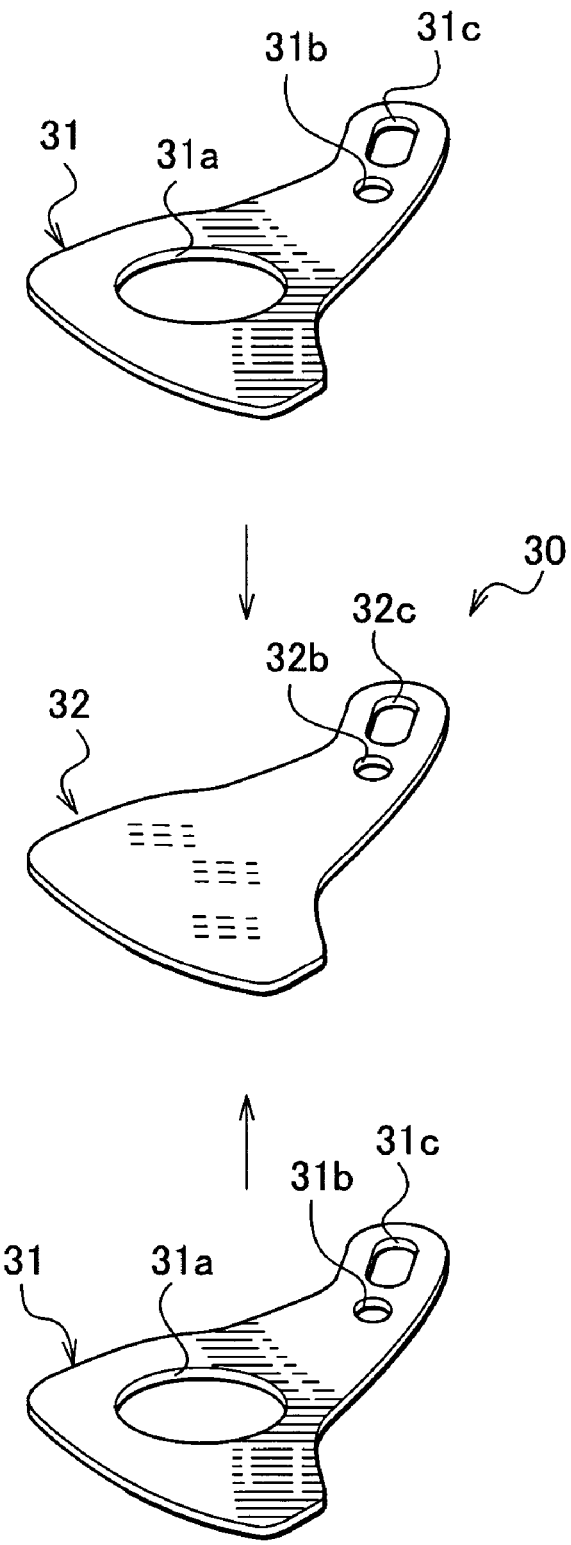
FIG. 3 is an exploded perspective view showing an ND filter blade as a blade member forming part of the device shown in FIG. 1.

The ND filter blade 30 is formed, as shown in FIG. 1 and FIG. 3, by sandwiching a film-shaped ND filter 32 between a pair of blades 31 formed from a plastic or metal material, and integrally joining these by means of adhesion, welding, or caulking, etc. The ND filter blade 30 has an aperture 30a with a diameter smaller than that of the exposure aperture 10a, a circular hole 30b for inserting the supporting shaft 10b, and a long hole 30c for inserting the drive pin 42b. The diameter of the aperture 30a may be formed to be larger than the exposure aperture 10a.

The pair of blades 31 have, as shown in FIG. 3, an aperture 31a that defines the aperture 30a, a circular hole 31b that defines the circular hole 30b, and a long hole 31c that defines the long hole 30c. The ND filter 32 is, as shown in FIG. 3, formed to have the same outline form as that of the pair of blades 31, and has a circular hole 32b that defines the circular hole 30b and a long hole 32c that defines the long hole 30c. The ND filter 32 is an optical density filter that reduces the amount of light with almost no change in color. In addition, ND stands for neutral density.

In the ND filter blade 30, as shown in FIG. 4, the supporting shaft 10b is inserted into the circular hole 30b and the drive pin 42b is inserted into the long hole 30c, so that the ND filter blade 30 is rotatably supported around the supporting shaft 10b, and the ND filter blade moves to a position withdrawn from the exposure aperture 10a as shown in FIG. 4 and moves to a position facing the exposure aperture 10a as shown in FIG. 5 by reciprocating the drive pin 42b within a predetermined range.

As described above, the ND filter blade 30 has a laminated structure formed of the pair of blades 31 and the ND filter 32 having the same outline form, so that the mechanical strength thereof is increased, the ND filter 32 can be prevented from being flawed, and furthermore, a blanking die can be commonly used, resulting in reduction in manufacturing costs.

The electromagnetic actuator 40 is formed of, as shown in FIG. 1, FIG. 2, FIG. 4, and FIG. 5, a frame member 41 to be joined to the main plate 10, the rotor 42 having a magnet part 42a magnetized so as to have an N pole and an S pole and the drive pin 42b, an exciting coil 43, a cylindrical yoke 44 disposed coaxially with the rotor 42, and iron pins 45, etc. The yoke 44 forms a magnetic path by being attached to the frame member 41 outside the coil 43, and the iron pins 45 generate a magnetic attractive force between the same and the rotor 42.

The frame member 41 is formed of, as shown in FIG. 2, FIG. 4, and FIG. 5, a bearing hole 41a that supports one end 42c of the rotor 42, a winding groove 41b for winding the coil 43, a joint surface 41c to be joined to the joint surface 14 of the main plate 10, two fitting pins 41d formed to project from the joint surface 41c, a fitting hole 41e fitted with the annular convex portion 13, and concave portions 41f to which the iron pins 45 are attached, and so on.

To attach the frame member 41, the other end 42d of the rotor 42 is inserted into the bearing hole 12 of the projection 11, the one end 42c of the rotor 42 is inserted into the bearing hole 41a of the frame member 41 to support the rotor 42 in a rotatable manner, and the fitting pin 41d is fitted into the fitting hole 15 and the annular convex portion 13 is fitted into the fitting hole 41e, whereby the frame member 41 is joined to the projection 11 of the main plate 10. At this time, the relationship between the fitting pin 41d and the fitting hole 15 and the relationship between the annular convex portion 13 and the fitting hole 41e are in a slightly fastened and fitted condition, so that the frame member 41 is tightly joined to the projection 11 while being positioned there.

Subsequently, the coil 43 is wound around the winding groove 16 of the projection 11 and the winding groove 41b of the frame member 41, whereby the frame member 41 is firmly fastened to the projection 11. In this joined state, the rotor 42 is rotatable within a predetermined angle range, that is, a range within which the drive pin 42b is limited by the fan-shaped through hole 10c.

As described above, the rotor 42 is rotatably supported by the frame member 41 and the main plate 10 (projection 11), and the coil 43 is wound around the frame member 41 and the main plate 10 (projection 11), so that the electromagnetic actuator 40 can be assembled simultaneously with the step of attaching various parts to the main plate 10.

Namely, since only one frame member is used in comparison with the conventional case, and the frame member 41 is joined to the main plate 10 by means of fitting and fastened by the coil 43, the fastening parts such as screws used in the conventional art become unnecessary, whereby the number of parts is reduced, the structure is simplified and reduced in costs, and in addition, the structure of the electromagnetic actuator 40 is simplified and lowered in height, and the device can be downsized (made thinner).

Furthermore, the center of the angle range (the fan-shaped through hole 10c) of the rotation of the rotor 42 (drive pin 42b) is formed so as to be positioned on the straight line L passing through the center of the exposure aperture 10a and extending in the diameter direction as shown in FIG. 4. Therefore, the rotor 42 can rotate to the left and right from this straight line L by equal angles.

Furthermore, the coil 43 is, as shown in FIG. 4 and FIG. 5, wound in the winding grooves 41b and 16 so as to surround one end 42c and the other end 42d of the rotor 42 from the upper and lower sides in the direction roughly perpendicular to the straight line L while the frame member 41 is joined to the projection 11 of the main plate 10, and fastens the frame member 41 to the main plate 10.

Thus, the rotor 42 is disposed so that the center of the angle range of the rotation is positioned almost on the straight line L that passes through the center of the exposure aperture 10a and extends in the diameter direction, and the coil 43 is wound in the direction almost perpendicular to the straight line L, so that the range of angle of the rotation of the rotor 42 can be set to be wide.

Next, operations when this device is installed in a digital camera, etc., are described briefly. First, in a non-energized state of the coil 43, the rotor 42 is positioned at the end of the counterclockwise rotation and kept there by the magnetic urging force of the iron pins 45, etc., (attractive force generated between the same and the rotor 42) as shown in FIG. 4. At this point, the ND filter blade 30 is at the withdrawn position where it opens the exposure apertures 10a and 20a.

In this standby state, when a photographer performs a release operation, the amount of light is automatically measured, and when it is judged that the amount of light needs to be reduced, the coil 43 is energized, and as shown in FIG. 5, the rotor 42 rotates and the ND filter blade 30 moves to a position facing the exposure apertures 10a and 20a to reduce the amount of light to pass through the exposure apertures 10a and 20a to a predetermined level. Thereafter, the electronic shutter of the CCD operates to take an image, and the taken image is subjected to various processing and taken in a storage part, and then the photographing is completed. Thereafter, the rotor 42 rotates in reverse due to reverse energization, and the ND filter 30 returns to the position withdrawn from the exposure apertures 10a and 20a and is kept there.

Figure 6:
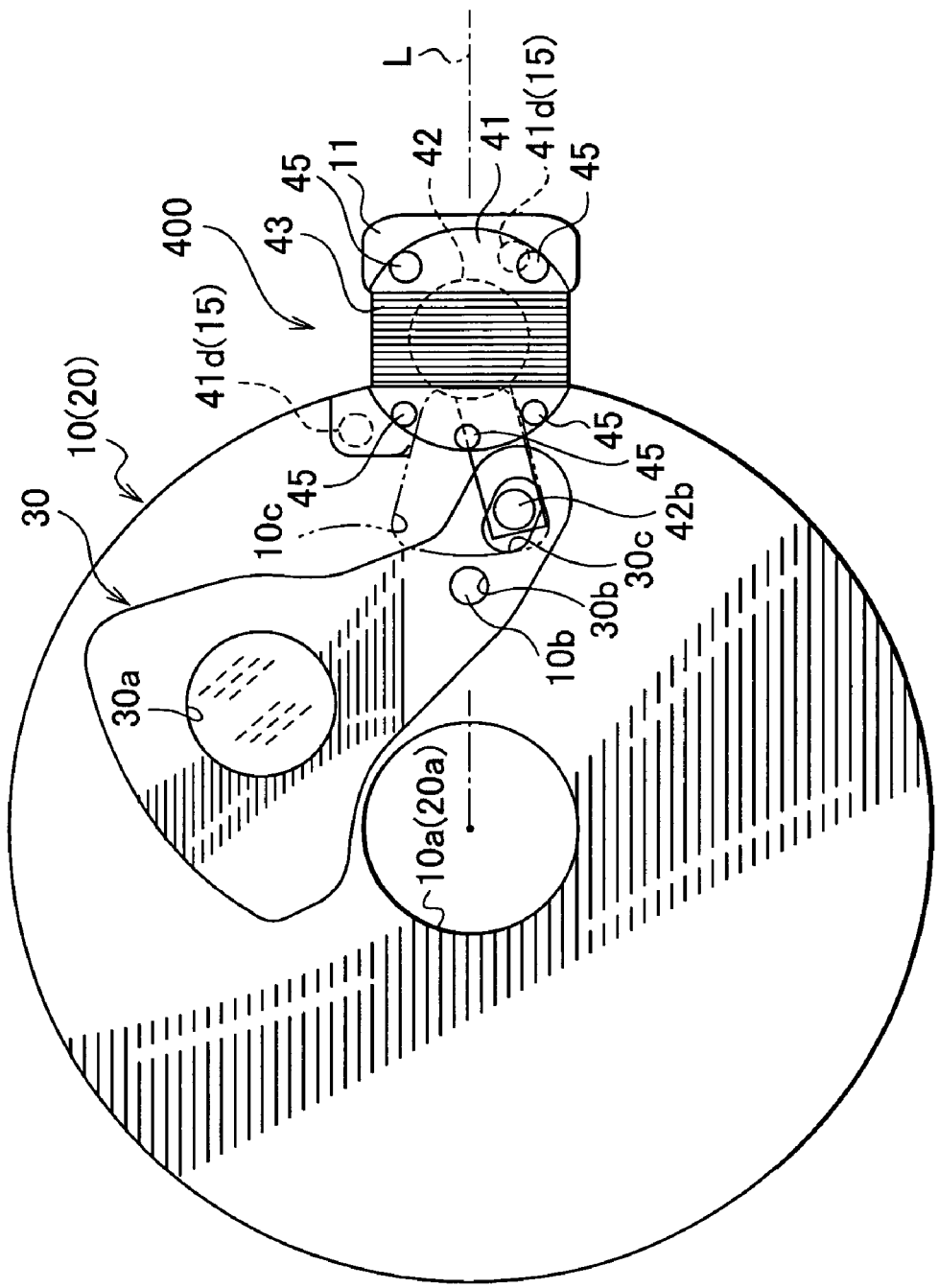
FIG. 6 is a plan view showing another embodiment of the electromagnetic actuator.

In the embodiment described above, a case where a yoke 44 forming a magnetic path is provided as the electromagnetic actuator 40 is shown; however, when the lines of magnetic force that effectively act are sufficient, as shown in FIG. 6, it is possible to employ an electromagnetic actuator 400 that is obtained by omitting the yoke 44 from the aforementioned electromagnetic actuator 40.

Figure 8:
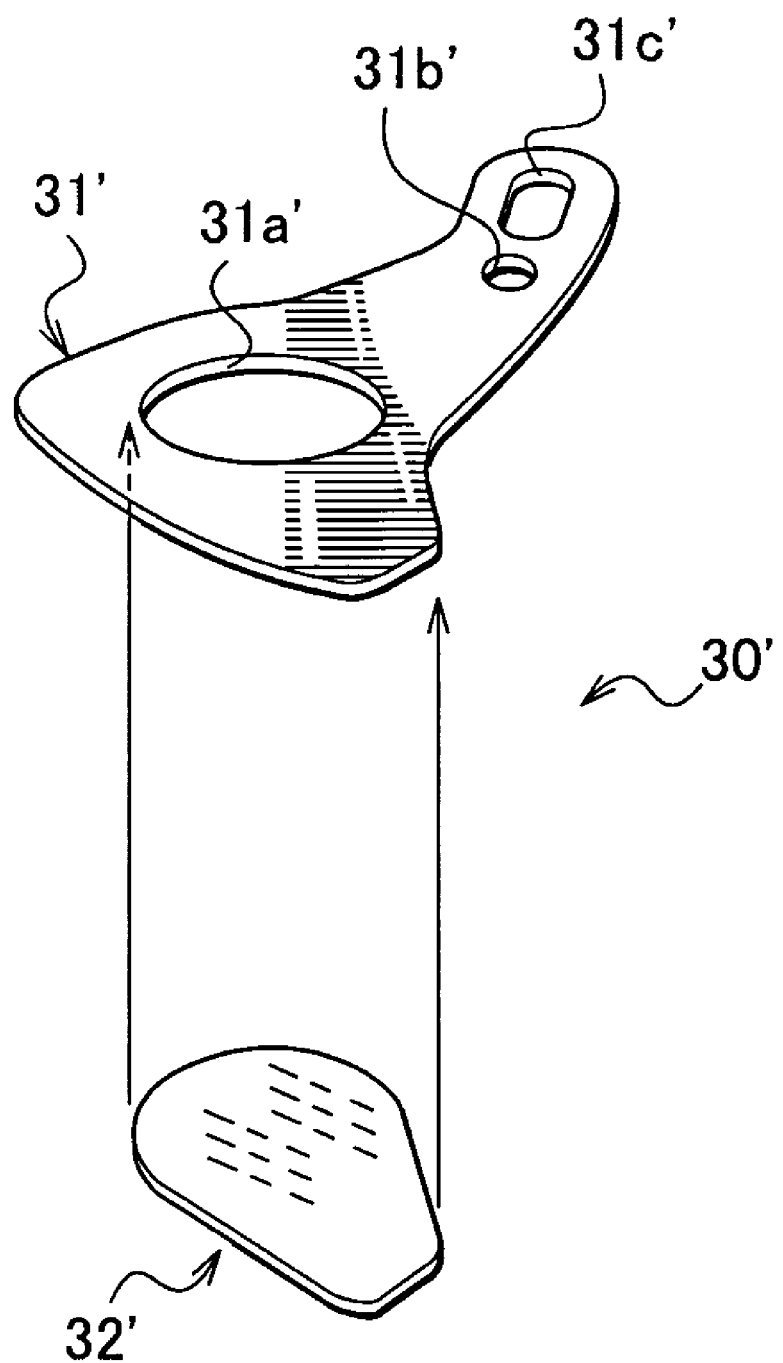
FIG. 8 is an exploded perspective view showing an ND filter as a blade member forming part of the device shown in FIG. 7.

FIG. 7 and FIG. 8 show a light amount adjusting device for use in cameras as another embodiment of the blade driving device for use in cameras relating to the present invention. In this embodiment, except for the change where the ND filter blade 30' and the back plate 20' are used, the same structure as in the embodiment shown in FIG. 1 through FIG. 5 described above is employed, so that the same components are attached with the same symbols and a description thereof is omitted.

In this device, the ND filter blade 30' is formed by joining a film-shaped ND filter 32' to the back surface of one blade 31' made of a plastic or metal material by means of adhesion, welding, caulking, etc., as shown in FIG. 7 and FIG. 8. The ND filter 32' has an aperture 30a' with a diameter smaller than that of the exposure aperture 10a, a circular hole 30b' for inserting the supporting shaft 10b, and a long hole 30c' for inserting the drive pin 42b.

The blade 31' has an aperture 31a' that defines the aperture 30a', a circular hole 31b' that defines the circular hole 30b', and a long hole 31c' that defines the long hole 30c' as shown in FIG. 8. The ND filter 32' is formed into a size covering at least the aperture 31a' and stuck onto the back surface of the blade 31'.

The back plate 20' has an aperture 20a' that is formed into a curved long hole shape and defines an exposure aperture portion corresponding to the exposure aperture 10a of the main plate 10 and the relief portion of the ND filter 32', a circular hole 20b' for inserting the supporting shaft 10b, and a long hole 20c' for inserting the drive pin 42b, and so on, and is fastened to the back surface of the main plate 10 by screws, etc., after the ND filter 300' is disposed in a blade chamber W.

Thus, the ND filter blade 30' is formed of one blade 31' and an ND filter 32' stuck to only a region covering the aperture 30a' (31a'), so that it is made thinner and lighter in weight than the aforementioned ND filter blade 30.

Furthermore, by forming an aperture 20a' that defines the relief portion of the ND filter 32' in the back plate 20', when the ND filter blade 30' and the back plate 20' are attached to the main plate 10, they can be made closer to each other and attached, so that the entirety of the device can be made thinner. The operation of this device is the same as in the aforementioned embodiment, so that a description thereof is omitted.

In addition, the same electromagnetic actuator 40 as described above is employed, so that the cost of the entire device can be reduced, and even when the electromagnetic actuator 40 is replaced, replacement can be simply and easily carried out since the number of components thereof is smaller than in the conventional device.

In this embodiment also, the electromagnetic actuator 400 in which the yoke 44 is omitted as shown in FIG. 6 can be employed in place of the electromagnetic actuator 40.

Figure 10:
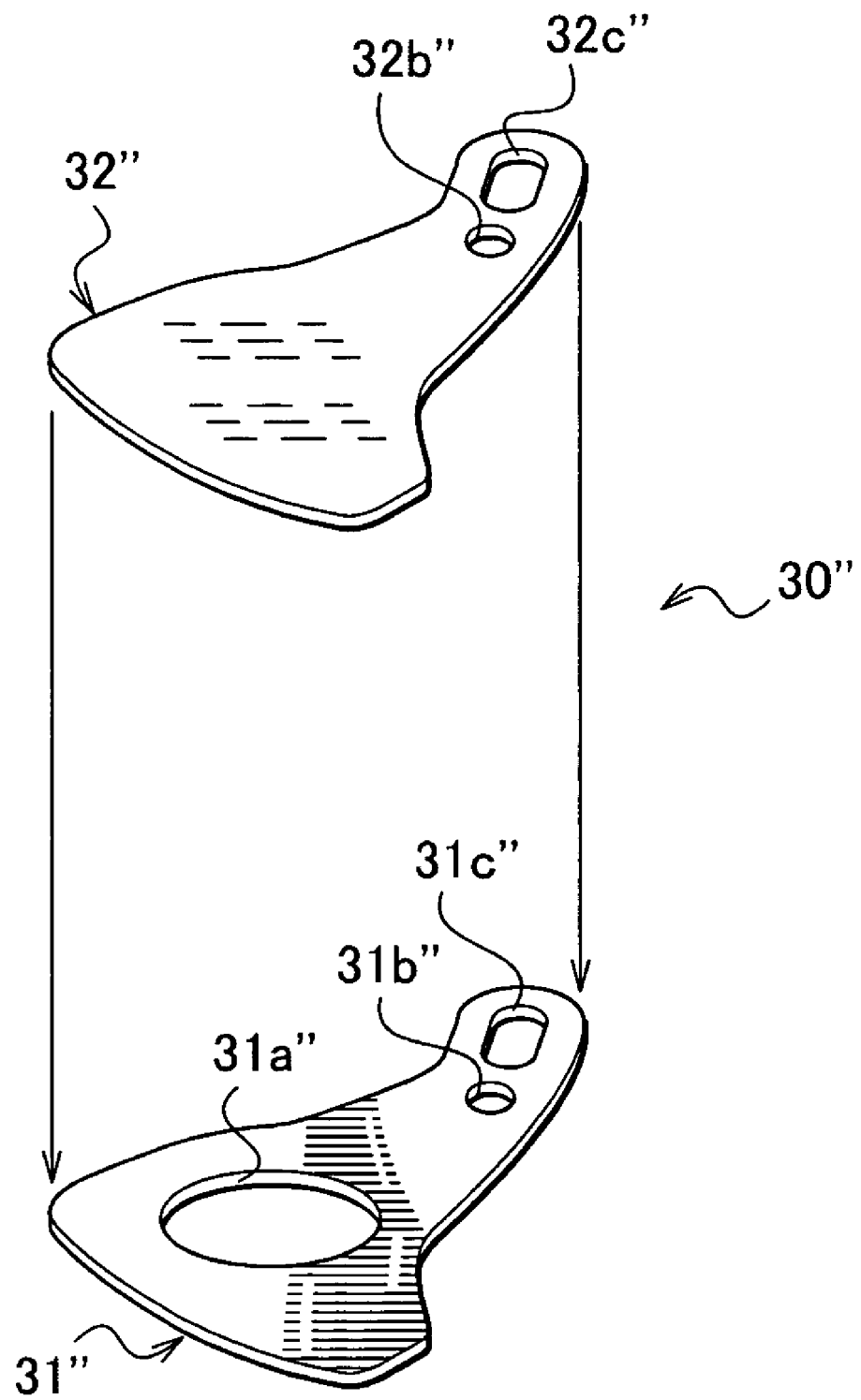
FIG. 10 is an exploded perspective view showing an ND filter blade as a blade member forming part of the device shown in FIG. 9.

FIG. 9 and FIG. 10 show a light amount adjusting device for use in cameras as still another embodiment of the blade driving device for use in cameras relating to the present invention. In this embodiment, except for the change where the ND filter blade 30" and the main plate 10' are used, the same structure as in the embodiment shown in FIG. 1 through FIG. 5 described above is employed, so that the same components are attached with the same symbols and a description thereof is omitted.

In this device, the ND filter blade 30" is formed by, as shown in FIG. 9 and FIG. 10, joining a film-shaped ND filter 32" to one side surface of one blade 31" formed from a plastic or metal material by means of adhesion, welding, or caulking, etc. The ND filter blade 30" has an aperture 30a with a diameter smaller than that of the exposure aperture 10a, a circular hole 30b" for inserting the supporting shaft 10b, and a long hole 30c" for inserting the drive pin 42b.

The blade 31" has an aperture 31a" that defines the aperture 30a", a circular hole 31b" that defines the circular hole 30b", and a long hole 31c" that defines the long hole 30c" as shown in FIG. 10. The ND filter 32" is formed to have the same outline form as that of the blade 31", and has a circular hole 32b" that defines the circular hole 30b" and a long hole 32c" that defines the long hole 30c".

The main plate 10' has two guide rails 10d that are formed to project inward in an arc shape so as to sandwich the exposure aperture 10a as shown in FIG. 9. While the ND filter blade 30" is rotatably supported by the supporting shaft 10b, the outside surface of the ND filter 32" (the opposite side surface of the surface joined to the blade 31") is supported by the guide rails 10d.

Therefore, the ND filter blade 30" can smoothly move to the position facing the exposure aperture 10a and the position withdrawn from the exposure aperture 10a by being guided by the guide rails 10d. The operation of this device is the same as in the aforementioned embodiment, so that a description thereof is omitted.

In this embodiment also, the same electromagnetic actuator 40 as described above is employed, so that the cost of the entire device can be reduced, and even when the electromagnetic actuator 40 is replaced, replacement can be simply and easily carried out since the number of components thereof is smaller than in the conventional art.

Furthermore, in this embodiment, it is also possible that the electromagnetic actuator 400 in which the yoke 44 is omitted as shown in FIG. 6 is employed in place of the electromagnetic actuator 40.

Figure 14:
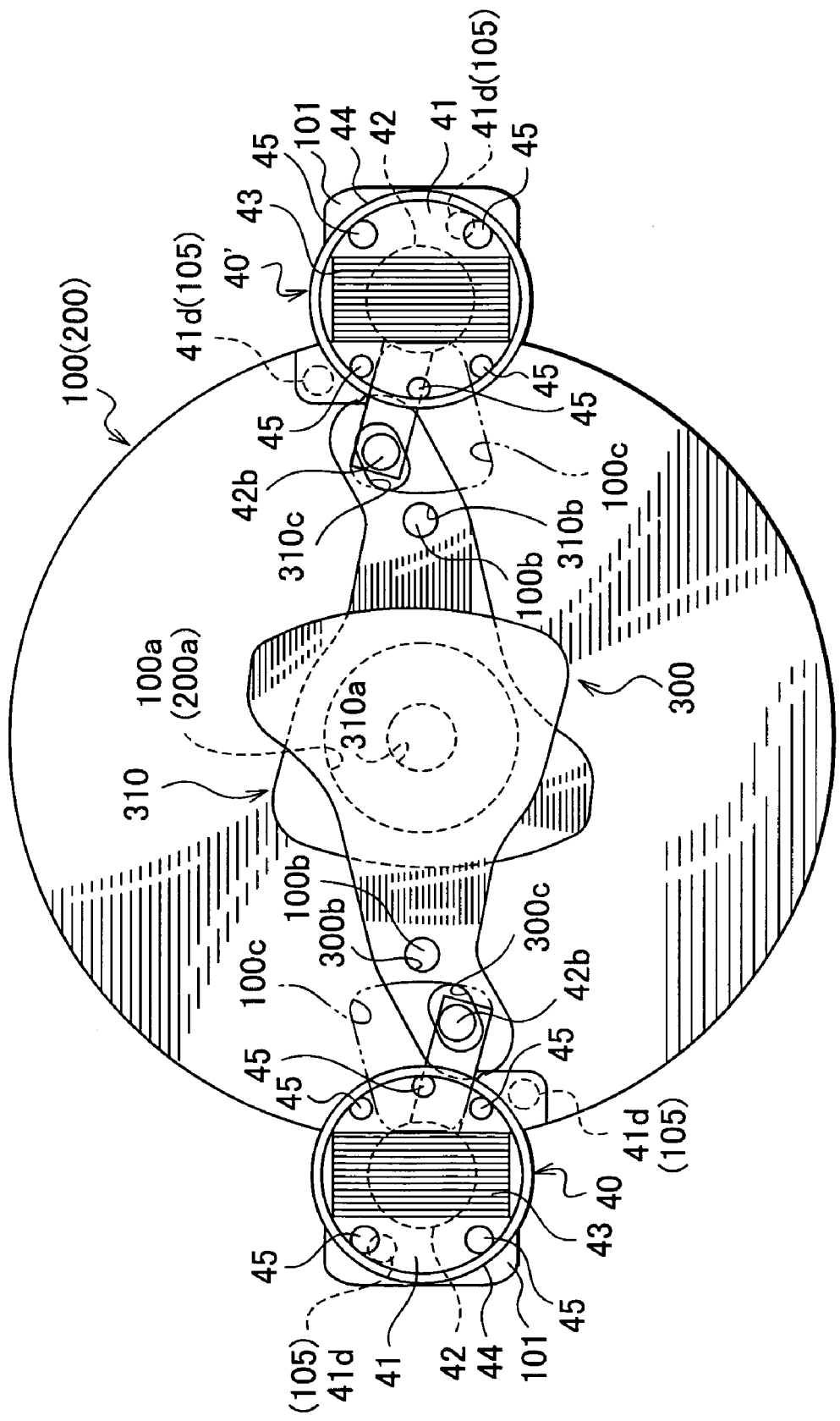
FIG. 14 is a plan view showing a condition where the shutter blade and the diaphragm blade are at positions facing the exposure aperture in the device shown in FIG. 11.

FIG. 11 and FIG. 14 show still another embodiment of the blade driving device for use in cameras relating to the present invention.

Figure 12:
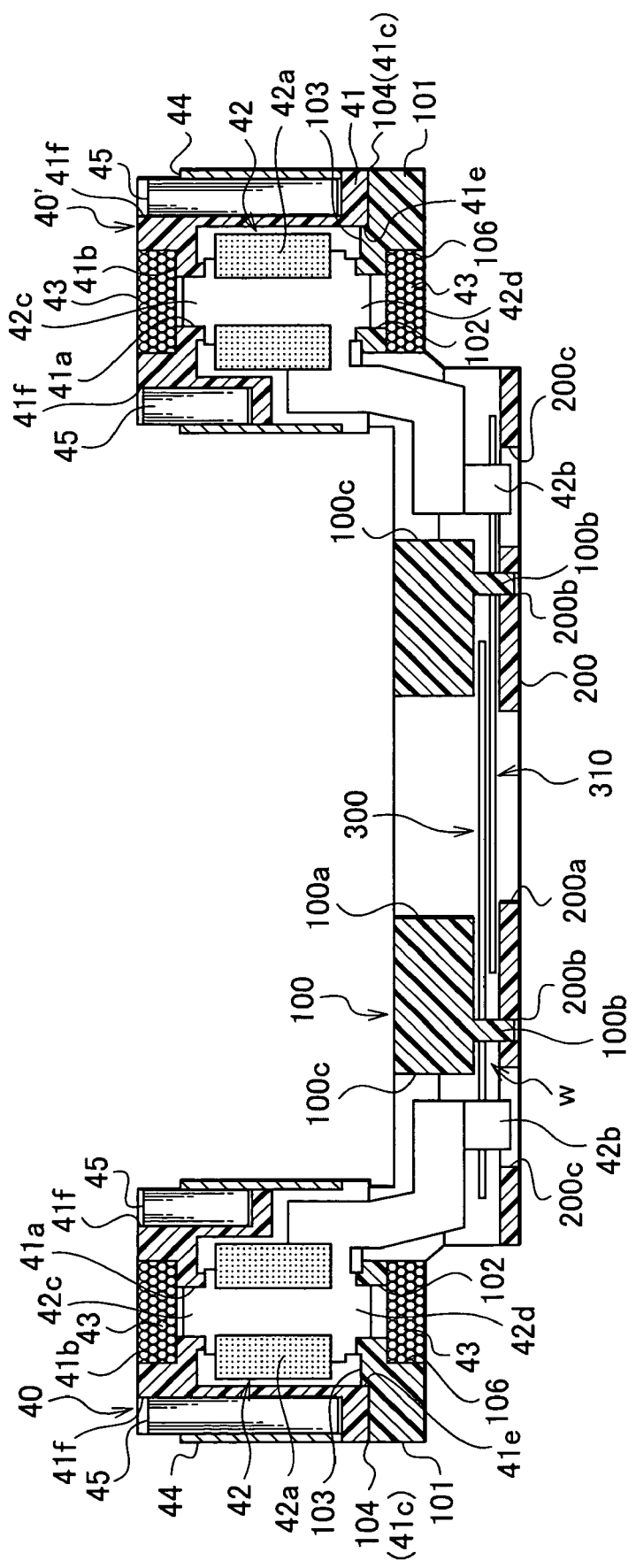
FIG. 12 is a sectional view of the device shown in FIG. 11.

This device includes, as shown in FIG. 11 and FIG. 12, a main plate 100 and a back plate 200 as a base plate that have exposure apertures 100a and 200a, a shutter blade 300 and a diaphragm blade 310 as blade members that are rotatably supported around a supporting shaft 100b on the main plate 100 and move to positions facing the exposure apertures 100a and 200a and positions withdrawn from the exposure apertures 100a and 200a, an electromagnetic actuator 40 that drives the shutter blade 300, and an electromagnetic actuator 40' that drives the diaphragm blade 310, and so on. The electromagnetic actuator 40' has the same structure as that of the electromagnetic actuator 40.

As shown in FIG. 11 through FIG. 14, the main plate 100 is roughly formed into a disk shape, and at a part of the outline form thereof, two plate-shaped projections 101 are integrally formed to project outward from diametrically opposite sides of the main plate 100 with respect to the exposure aperture 100a, and in an inside region of each projection 101, a roughly fan-shaped through hole 100c is formed.

At each projection 101 and the vicinity thereof, as shown in FIG. 11 through FIG. 14, a bearing hole 102 for supporting the other end 42d of the rotor 42, an annular convex portion 103 around the bearing hole 102, and a flat joint surface 104 around the annular convex portion 103, two fitting holes 105 opened in the joint surface 104, and a winding groove 106 for winding a coil 43 are formed.

As shown in FIG. 11 and FIG. 12, the back plate 200 has an exposure aperture 200a, a circular hole 200b for inserting the supporting shaft 100b and a long hole 200c for inserting the drive pin 42b, and so on, and is joined to the main plate 100 while leaving a predetermined space and defines a blade chamber W for housing the shutter blade 300 and the diaphragm blade 310.

Figure 13:
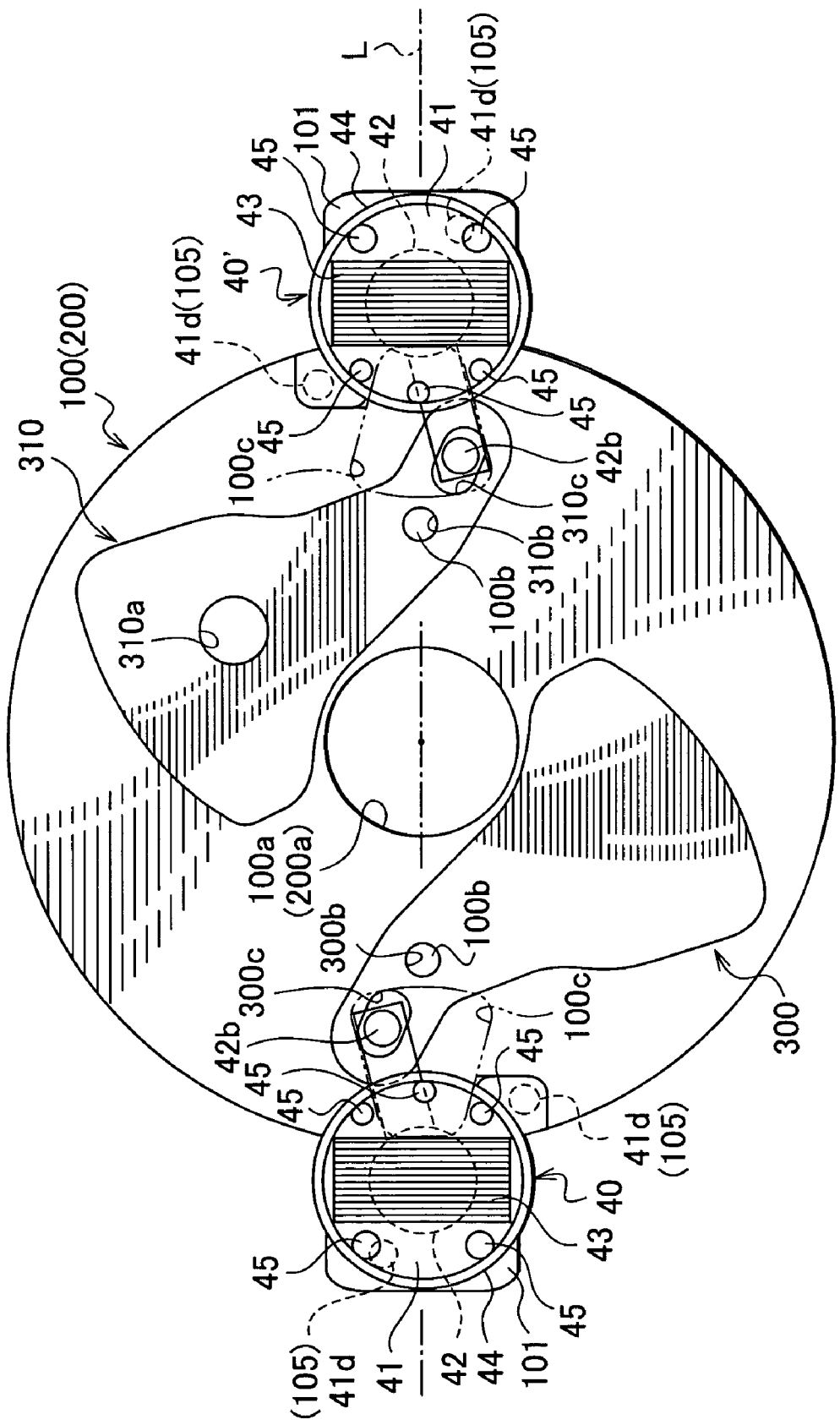
FIG. 13 is a plan view showing a condition where the shutter blade and the diaphragm blade are at positions withdrawn from the exposure aperture in the device shown in FIG. 11.

As shown in FIG. 11, FIG. 13, and FIG. 14, the shutter blade 300 has a circular hole 300b and a long hole 300c, and is supported to be rotatable around the supporting shaft 100b by inserting the supporting shaft 100b into the circular hole 300b and inserting the drive pin 42b of the electromagnetic actuator 40 into the long hole 300c, and by reciprocation of the drive pin 42b within a predetermined range, the shutter blade 300 moves to a position (opening position) withdrawn from the exposure aperture 10a as shown in FIG. 13 and a position (closing position) facing the exposure aperture 10a as shown in FIG. 14.

The diaphragm blade 310 has, as shown in FIG. 11, FIG. 13, and FIG. 14, a diaphragm aperture 310a with a predetermined diameter, a circular hole 310b and a long hole 310c, and is supported to be rotatable around the supporting shaft 100b by inserting the supporting shaft 100b into the circular hole 310b and inserting the drive pin 42b of the electromagnetic actuator 40' into the long hole 310c, and by reciprocation of the drive pin 42b within a predetermined range, the diaphragm blade 310 moves to a position (non-stopping down position) withdrawn from the exposure aperture 10a as shown in FIG. 13 and a position (stopping down position) facing the exposure aperture 10a as shown in FIG. 14.

Namely, the electromagnetic actuator 40 drives the shutter blade 300 to open and close the exposure aperture 10a, and the electromagnetic actuator 40' drives the diaphragm blade 310 to stop down the exposure aperture 10a to a predetermined diameter. According to this, a shutter device for use in cameras to open and close the exposure aperture 10a and a diaphragm device for use in cameras to stop down the exposure aperture 10a to a predetermined diameter are compatible in one device, and a camera or the like in which this device is installed can be downsized. The operations of the shutter blade 300 and the diaphragm blade 310 are opening and closing operations and stopping down operations generally used, so that a description thereof is omitted herein.

In this embodiment also, the same electromagnetic actuators 40 and 40' as described above are employed, so that the cost of the entire device can be reduced, and even when the electromagnetic actuators 40 and 40' are replaced, replacement can be simply and easily carried out since the number of components thereof is smaller than in the conventional art.

Also, in this embodiment, it is possible that the electromagnetic actuator 400 in which the yoke 44 is omitted as shown in FIG. 6 is employed in place of the electromagnetic actuator 40 and 40'.

Figure 15:
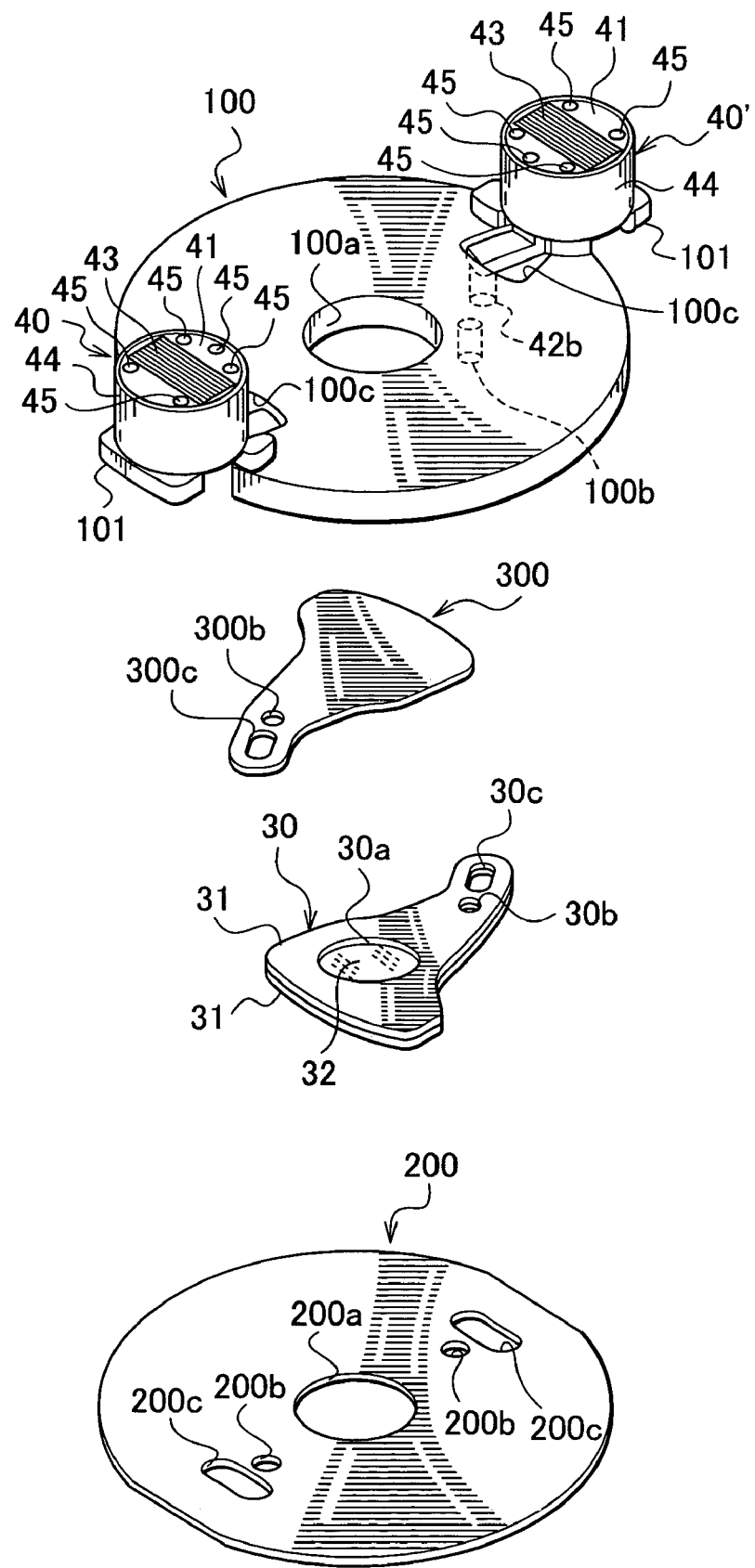
FIG. 15 is an exploded perspective view showing still another embodiment of the blade driving device for use in cameras relating to the present invention.

FIG. 15 shows still another embodiment of the blade driving device for use in cameras relating to the present invention. In this embodiment, except that the ND filter blade 30 shown in FIG. 1 is employed in place of the diaphragm blade 310, the same structure as in the embodiment shown in FIG. 11 through FIG. 14 described above is employed, so that the same components are attached with the same symbols and a description thereof is omitted.

In this device, the electromagnetic actuator 40 drives the shutter blade 300 to open and close the exposure aperture 10a, and the electromagnetic actuator 40' drives the ND filter blade 30 to adjust the amount of light to pass through the exposure aperture 10a. According to this, a shutter device for use in cameras for opening and closing the exposure aperture 10a and a light amount adjusting device for use in cameras for adjusting the amount of light to pass through the exposure aperture 10a are compatible in one device, and a camera or the like in which this device is installed can be downsized. The operations of the shutter blade 300 and the ND filter blade 30 are opening and closing operations and stopping down operations generally used, so that a description thereof is omitted herein.

Also in this embodiment, the same electromagnetic actuators 40 and 40' as described above are employed, so that the cost of the entire device can be reduced, and even when the electromagnetic actuators 40 and 40' are replaced, replacement can be simply and easily carried out since the number of components is smaller than in the conventional art.

In this embodiment, it is also possible that the electromagnetic actuator 400 in which the yoke 44 is omitted as shown in FIG. 6 can be employed in place of the electromagnetic actuators 40 and 40'.

FIG. 16 shows still another embodiment of the blade driving device for use in cameras relating to the present invention. In this embodiment, except that the ND filter blade 30' shown in FIG. 7 is employed in place of the diaphragm blade 310 and the back plate 200' is partially changed, the same structure as that of the embodiment shown in FIG. 11 through FIG. 14 described above is employed, so that the same components are attached with the same symbols and a description thereof is omitted.

In this device, the back plate 200' has, as shown in FIG. 16, an aperture 200a' shaped into a curved long hole that defines an exposure aperture portion corresponding to the exposure aperture 100a of the main plate 100 and the relief portion of the ND filter 32', a circular hole 200b for inserting the supporting shaft 100b, and a long hole 200c for inserting the drive pin 42b, etc.

Namely, the electromagnetic actuator 40 drives the shutter blade 300 to open and close the exposure aperture 10a, and the electromagnetic actuator 40' drives the ND filter blade 30' to adjust the amount of light to pass through the exposure aperture 10a. According to this, a shutter device for use in cameras for opening and closing the exposure aperture 10a and a light amount adjusting device for use in cameras for adjusting the amount of light to pass through the exposure aperture 10a are compatible in one device, and a camera or the like in which this device is installed can be downsized. The operations of the shutter blade 300 and the ND filter blade 30' are opening and closing operations and stopping down operations generally used, so that a description thereof is omitted herein.

Also in this embodiment, since the same electromagnetic actuators 40 and 40' as described above are employed, the cost of the entire device can be reduced, and even when the electromagnetic actuators 40 and 40' are replaced, replacement can be simply and easily carried out since the number of components is smaller than in the conventional art.

Also, in this embodiment, it is possible that the electromagnetic actuator 400 in which the yoke 44 is omitted as shown in FIG. 6 is employed in place of the electromagnetic actuators 40 and 40'.

Figure 17:
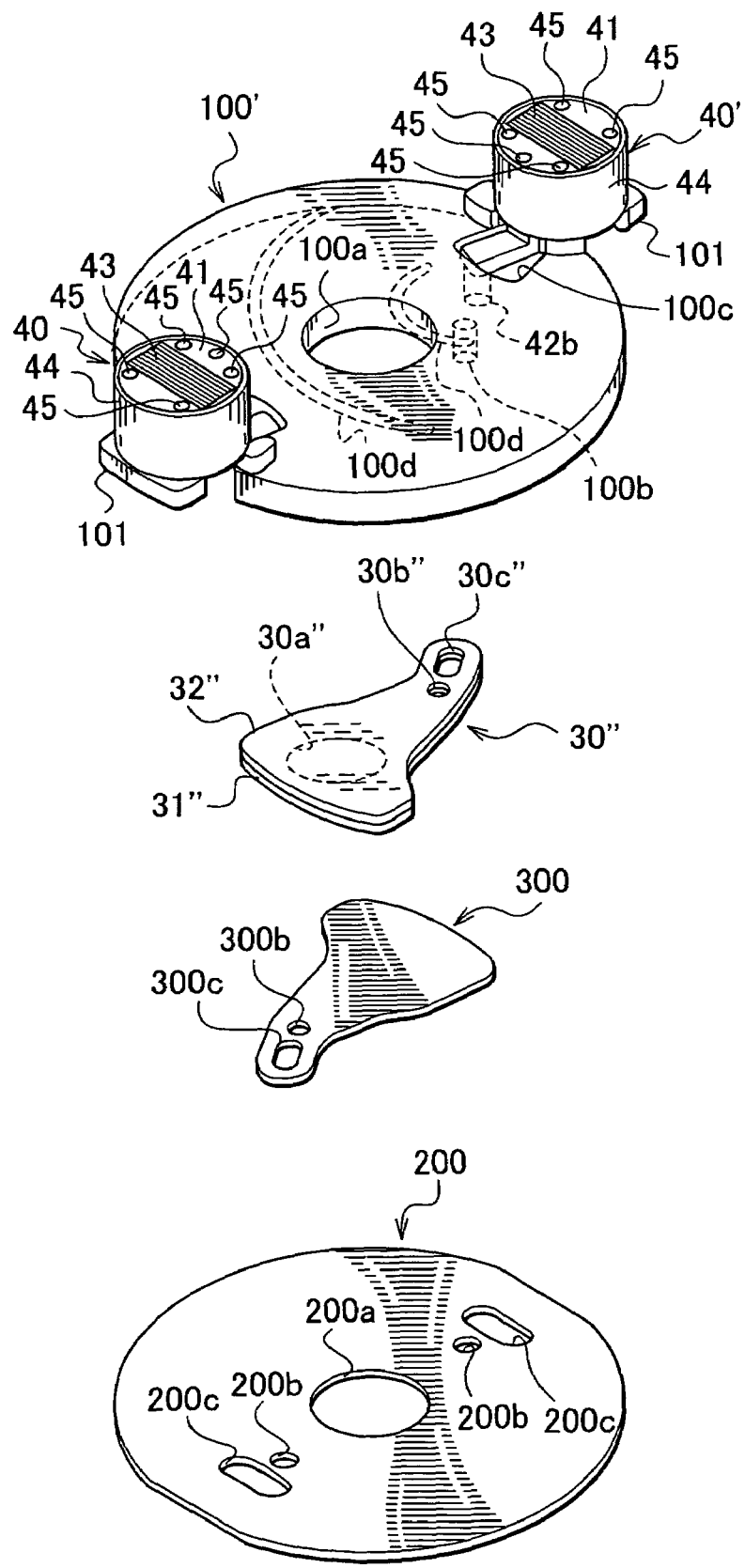
FIG. 17 is an exploded perspective view showing still another embodiment of the blade driving device for use in cameras relating to the present invention.

FIG. 17 shows still another embodiment of the blade driving device for use in cameras relating to the present invention. In this embodiment, except that the ND filter blade 30" shown in FIG. 9 is employed in place of the diaphragm blade 310 and the main plate 100' is partially changed, the same structure as in the embodiment shown in FIG. 11 through FIG. 14 described above is employed, so that the same components are attached with the same symbols and a description thereof is omitted.

In this device, as shown in FIG. 17, the main plate 100' has two guide rails 100d formed to project inward in an arc form so as to sandwich the exposure aperture 100a. While the ND filter blade 30" is rotatably supported by the supporting shaft 10b, the outside surface of the ND filter 32" (the opposite side surface of the surface joined to the blade 31") is supported in such a manner as to slide on the guide rails 100d. Therefore, the ND filter blade 30" can smoothly move to the position facing the exposure aperture 100a and the position withdrawn from the exposure aperture 100a by being guided by the guide rails 100d.

Namely, the electromagnetic actuator 40 drives the shutter blade 300 to open and close the exposure aperture 10a, and the electromagnetic actuator 40' drives the ND filter blade 30" to adjust the amount of light to pass through the exposure aperture 10a. According to this, a shutter device for use in cameras for opening and closing the exposure aperture 10a and a light amount adjusting device for use in cameras for adjusting the amount of light to pass through the exposure aperture 10a are compatible in one device, and a camera or the like in which this device is installed can be downsized. Furthermore, the operations of the shutter blade 300 and the ND filter blade 30" are opening and closing operations and stopping down operations generally used, so that a description thereof is omitted herein.

In this embodiment also, the same electromagnetic actuators 40 and 40' as described above are employed, so that the cost of entire device can be reduced, and even when the electromagnetic actuators 40 and 40' are replaced, the replacement can be simply and easily carried out since the number of components thereof is smaller than in the conventional art.

Furthermore, in this embodiment, it is also possible that the electromagnetic actuator 400 in which the yoke 44 is omitted as shown in FIG. 6 can be employed in place of the electromagnetic actuators 40 and 40'.

The abovementioned embodiments employ the structures in which projections 11 and 101 are provided on the base plate (main plates) 10, 10', 100, and 100' having outline forms roughly shaped into disks, and the frame member 41 is joined to the projections 11 and 101. However, it is also possible that the base plates are formed so that their outline forms have roughly rectangular shapes or other shapes in place of the disk shapes and a part of the base plate defines the projections, and the frame member 41 is joined to the projections.

Furthermore, the abovementioned embodiments show structures in which two electromagnetic actuators 40 and 40' having the same structure are provided, and one electromagnetic actuator 40 drives the shutter blade 300 and the other electromagnetic actuator 40' drives the diaphragm blade 310 or the ND filter blade 30, 30', 30". However, the present invention is not limited to these, and it is also possible that two diaphragm blades with diameters different from each other are employed, one electromagnetic actuator 40 drives one diaphragm blade, and the other electromagnetic actuator 40' drives the other diaphragm blade, or it is also possible that two ND filter blades with densities different from each other are employed, one electromagnetic actuator 40 drives one ND filter blade and the other electromagnetic actuator 40' drives the other ND filter blade. Furthermore, it is also possible that a diaphragm blade 310 and ND filter blade 30, 30', or 30" are employed and one electromagnetic actuator 40 drives the diaphragm blade 310 and the other electromagnetic actuator 40' drives the ND filter blade 30, 30', or 30".

As described above, according to the blade driving device for use in cameras of the present invention, a structure is employed in which an electromagnetic actuator which drives a blade member such as a shutter blade, a diaphragm blade, or an ND filter blade, etc., that is supported in such a manner as to rotate around a supporting shaft on a base plate and is moved to a position withdrawn from an exposure aperture and a position facing the exposure aperture, includes a frame member joined to the base plate, a rotor which has a drive pin for exerting a driving force to the blade member and rotates within a predetermined angle range with one end of the rotor being supported by the frame member and the other end of the rotor being supported by the base plate, and an exciting coil wound around the frame member and the base plate, whereby the electromagnetic actuator can be assembled simultaneously with the step of attaching various parts to the substrate, only one frame is used in comparison with the conventional art, and fastening parts such as screws used in the conventional art become unnecessary.

Therefore, a small-sized and thin-type blade driving device for use in cameras can be provided which has a reduced number of parts, a simplified structure formed at low costs, an electromagnetic actuator with a simplified structure and a lower height, and can drive a shutter blade, a diaphragm blade, or an ND filter blade.

Furthermore, the blade driving device for use in cameras of the present invention can be used in digital cameras to be installed in information terminal devices such as portable phones, portable personal computers, and PDAs, etc., other apparatus, and in addition, other digital cameras (digital still cameras, digital video cameras), silver-salt film cameras, etc.

What is claimed is:

1. A blade driving device for use in cameras, comprising:
a base plate having an exposure aperture;
a blade member supported rotatably around a supporting shaft on the base plate for movement to a position withdrawn from the exposure aperture and a position facing the exposure aperture; and
an electromagnetic actuator for driving the blade member, wherein
the electromagnetic actuator includes a frame member joined to the base plate, a rotor which has a drive pin that exerts a driving force to the blade member and rotates within a predetermined angle range with one end of the rotor being supported by the frame member and the other end of the rotor being supported by the base plate, and an exciting coil wound around the frame member and the base plate, and
the blade member is a shutter blade for opening and closing the exposure aperture, a diaphragm blade for stopping down the exposure aperture to a predetermined diameter, or an ND filter blade for reducing the amount of light by covering the exposure aperture.

2. The blade driving device according to claim 1, wherein the electromagnetic actuator includes a yoke provided outside the coil roughly coaxially with the rotor.

3. The blade driving device according to claim 1, wherein the ND filter blade includes a pair of blades that define an aperture with a predetermined diameter and an ND filter sandwiched between and joined to the pair of blades.

4. The blade driving device according to claim 1, wherein the ND filter blade includes a blade that defines an aperture with a predetermined diameter and an ND filter joined to one side surface of the blade.

5. The blade driving device according to claim 4, wherein the ND filter blade is formed so that an opposite side surface of the ND filter joined to the blade is supported by a guide rail provided on the base plate.

6. The blade driving device according to claim 1, wherein
said blade member constitutes a first blade member, said supporting shaft constitutes a first supporting shaft, said electromagnetic actuator constitutes a first electromagnetic actuator, said frame member constitutes a first frame member, said rotor constitutes a first rotor, said drive pin constitutes a first drive pin, and said exciting coil constitutes a first exciting coil;
a second blade member is supported rotatably around a second supporting shaft on the base plate for movement to a position withdrawn from the exposure aperture and a position facing the exposure aperture;
a second electromagnetic actuator is provided for driving the second blade member, wherein the second electromagnetic actuator includes a second frame member joined to the base plate, a second rotor which has a second drive pin that exerts a driving force to the second blade member and rotates within a predetermined angle range with one end of said second rotor being supported by the second frame member and the other end of said second rotor being supported by the base plate, and a second exciting coil wound around the second frame member and the base plate;
said first blade member comprises the shutter blade, and said second blade member comprises the diaphragm blade;
said first electromagnetic actuator is configured to drive said shutter blade; and
said second electromagnetic actuator is configured to drive said diaphragm blade.

7. The blade driving device according to claim 1, wherein
said blade member constitutes a first blade member, said supporting shaft constitutes a first supporting shaft, said electromagnetic actuator constitutes a first electromagnetic actuator, said frame member constitutes a first frame member, said rotor constitutes a first rotor, said drive pin constitutes a first drive pin, and said exciting coil constitutes a first exciting coil;
a second blade member is supported rotatably around a second supporting shaft on the base plate for movement to a position withdrawn from the exposure aperture and a position facing the exposure aperture;
a second electromagnetic actuator is provided for driving the second blade member, wherein the second electromagnetic actuator includes a second frame member joined to the base plate, a second rotor which has a second drive pin that exerts a driving force to the second blade member and rotates within a predetermined angle range with one end of said second rotor being supported by the second frame member and the other end of said second rotor being supported by the base plate, and a second exciting coil wound around the second frame member and the base plate;
said first blade member comprises the shutter blade, and said second blade member comprises the ND filter blade;
said first electromagnetic actuator is configured to drive said shutter blade; and
said second electromagnetic actuator is configured to drive said ND filter blade.

8. The blade driving device according to claim 1, wherein
said blade member constitutes a first blade member, said supporting shaft constitutes a first supporting shaft, said electromagnetic actuator constitutes a first electromagnetic actuator, said frame member constitutes a first frame member, said rotor constitutes a first rotor, said drive pin constitutes a first drive pin, and said exciting coil constitutes a first exciting coil;
a second blade member is supported rotatably around a second supporting shaft on the base plate for movement to a position withdrawn from the exposure aperture and a position facing the exposure aperture;
a second electromagnetic actuator is provided for driving the second blade member, wherein the second electromagnetic actuator includes a second frame member joined to the base plate, a second rotor which has a second drive pin that exerts a driving force to the second blade member and rotates within a predetermined angle range with one end of said second rotor being supported by the second frame member and the other end of said second rotor being supported by the base plate, and a second exciting coil wound around the second frame member and the base plate;
said first blade member comprises the diaphragm blade constituting a first diaphragm blade, and said second blade member comprises a second diaphragm blade, said second diaphragm blade having a different diameter than said first diaphragm blade;
said first electromagnetic actuator is configured to drive said first diaphragm blade; and
said second electromagnetic actuator is configured to drive said second diaphragm blade.

9. The blade driving device according to claim 1, wherein
said blade member constitutes a first blade member, said supporting shaft constitutes a first supporting shaft, said electromagnetic actuator constitutes a first electromagnetic actuator, said frame member constitutes a first frame member, said rotor constitutes a first rotor, said drive pin constitutes a first drive pin, and said exciting coil constitutes a first exciting coil;
a second blade member is supported rotatably around a second supporting shaft on the base plate for movement to a position withdrawn from the exposure aperture and a position facing the exposure aperture;
a second electromagnetic actuator is provided for driving the second blade member, wherein the second electromagnetic actuator includes a second frame member joined to the base plate, a second rotor which has a second drive pin that exerts a driving force to the second blade member and rotates within a predetermined angle range with one end of said second rotor being supported by the second frame member and the other end of said second rotor being supported by the base plate, and a second exciting coil wound around the second frame member and the base plate;
said first blade member comprises the ND filter blade constituting a first ND filter blade, and said second blade member comprises a second ND filter blade, said second ND filter blade having a different density than said first ND filter blade;

said first electromagnetic actuator is configured to drive said first ND filter blade; and said second electromagnetic actuator is configured to drive said second ND filter blade.

10. The blade driving device according to claim 1, wherein said blade member constitutes a first blade member, said supporting shaft constitutes a first supporting shaft, said electromagnetic actuator constitutes a first electromagnetic actuator, said frame member constitutes a first frame member, said rotor constitutes a first rotor, said drive pin constitutes a first drive pin, and said exciting coil constitutes a first exciting coil;

a second blade member is supported rotatably around a second supporting shaft on the base plate for movement to a position withdrawn from the exposure aperture and a position facing the exposure aperture;

a second electromagnetic actuator is provided for driving the second blade member, wherein the second electromagnetic actuator includes a second frame member joined to the base plate, a second rotor which has a second drive pin that exerts a driving force to the second blade member and rotates within a predetermined angle range with one end of said second rotor being supported by the second frame member and the other end of said second rotor being supported by the base plate, and a second exciting coil wound around the second frame member and the base plate;

said first blade member comprises the diaphragm blade, and said second blade member comprises the ND filter blade;

said first electromagnetic actuator is configured to drive said diaphragm blade; and said second electromagnetic actuator is configured to drive said ND filter blade.

* * * * *